US007995622B1

(12) United States Patent
Fagerlund et al.

(10) Patent No.: US 7,995,622 B1
(45) Date of Patent: Aug. 9, 2011

(54) DIGITAL CLOCK SMOOTHING

(75) Inventors: Richard John Fagerlund, San Jose, CA (US); James P. Flynn, Palo Alto, CA (US); Mark Fong, San Jose, CA (US); David Bruce Isaksen, Mountain View, CA (US)

(73) Assignee: Wideband Semiconductor, Inc., Mountain View, CA (US)

( * ) Notice: Subject to any disclaimer, the term of this patent is extended or adjusted under 35 U.S.C. 154(b) by 0 days.

(21) Appl. No.: 12/587,266

(22) Filed: Oct. 5, 2009

Related U.S. Application Data

(63) Continuation of application No. 11/357,685, filed on Feb. 18, 2006, now Pat. No. 7,613,211.

(51) Int. Cl.
*H04J 3/06* (2006.01)
*H04L 7/00* (2006.01)

(52) U.S. Cl. ....................................... 370/504; 375/372

(58) Field of Classification Search .................. 370/342, 370/503–505; 375/363, 372; 386/13; 710/57
See application file for complete search history.

(56) References Cited

U.S. PATENT DOCUMENTS 4,596,026 A * 6/1986 Cease et al. .................. 375/372
6,381,659 B2 4/2002 Proch et al.
6,501,809 B1 * 12/2002 Monk et al. .................. 375/363
6,714,717 B1 * 3/2004 Lowe et al. ..................... 386/13
7,613,211 B1 * 11/2009 Fagerlund et al. ........... 370/504

OTHER PUBLICATIONS

U.S. Appl. No. 11/357,685, Office Action dated Dec. 30, 2008, 11 pages.
U.S. Appl. No. 11/357,685, Notice of Allowance dated Dec. 30, 2008, 4 pages.

* cited by examiner

*Primary Examiner* — Ayaz R Sheikh
*Assistant Examiner* — Hai-Chang Hsiung
(74) *Attorney, Agent, or Firm* — Boris G. Tankhilevich

(57) ABSTRACT

A method for digital clock smoothing is provided. The method comprises: (A) inputting an asynchronous data stream having an asynchronous symbol rate into a FIFO two-port memory block; (B) obtaining FIFO depth B by subtracting modulo B for each stored symbol a symbol output address from a symbol input address; (C) inputting FIFO depth B into a programmable look-up table (LUT); (D) obtaining a phase detector error signal; (E) scaling the phase detector error signal to obtain a scaled error factor; (F) adding the scaled error factor to a nominal phase step to obtain a phase update; (G) obtaining a smoothed symbol rate; and (H) reading out each output symbol from FIFO under control of an output FIFO address control register at the smoothed symbol rate.

7 Claims, 5 Drawing Sheets

DIGITAL CLOCK SMOOTHING

This is a continuation of the U.S. patent application Ser. No. 11/357,685, entitled: "DIGITAL CLOCK SMOOTHING APPARATUS AND METHOD", and filed on Feb. 18, 2006 now U.S. Pat. No. 7,613,211.

TECHNICAL FIELD

The technology relates to the field of digital signal processing (DSP), and more specifically, to a digital clock smoothing apparatus and method.

BACKGROUND OF THE TECHNOLOGY

A continuous receiver can only be utilized where generally continuous communications (as opposed to burst communications as in the present technology) are performed, so as to substantially maintain timing synchronization between the transmitter and the receiver which is necessary for proper reception of the communicated information. During continuous communications, timing recovery is a more straightforward process since signal acquisition generally only occurs at the initiation of such communications. Thus, acquisition is generally only performed in continuous receivers once per continuous transmission and each continuous transmission may be very long.

On the other hand, the burst communications (for instance, for TDMA systems) require periodic and frequent reacquisition of the signal. That is, during TDMA communications, the signal must be reacquired for each separate burst transmission being received.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

A method for digital clock smoothing is provided. The method comprises: (A) inputting an asynchronous data stream having an asynchronous symbol rate into a FIFO two-port memory block; (B) obtaining FIFO depth B by subtracting modulo B for each stored symbol a symbol output address from a symbol input address; (C) inputting FIFO depth B into a programmable look-up table (LUT); (D) obtaining a phase detector error signal; (E) scaling the phase detector error signal to obtain a scaled error factor, wherein the scaled error factor is normalized by using a set of parameters selected from the group consisting of: {a ratio of an input symbol rate to a reference clock; and a damping factor configured to compensate for latency of the frequency lock loop (FLL)}; (F) adding the scaled error factor to a nominal phase step to obtain a phase update; (G) obtaining a smoothed symbol rate; and (H) reading out each output symbol from FIFO under control of an output FIFO address control register at the smoothed symbol rate.

DESCRIPTION OF THE DRAWINGS

The accompanying drawings, which are incorporated in and form a part of this specification, illustrate embodiments of the technology and, together with the description, serve to explain the principles below.

DETAILED DESCRIPTION

Reference now be made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

Figure 1A:
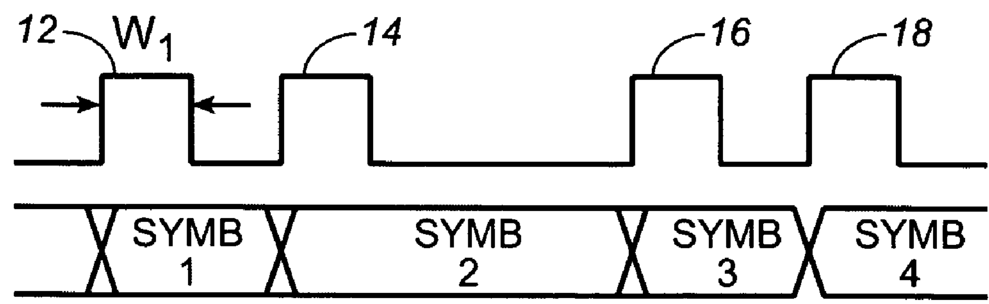
FIG. 1A depicts first several symbols of an asynchronous input burst signal.
Figure 1B:
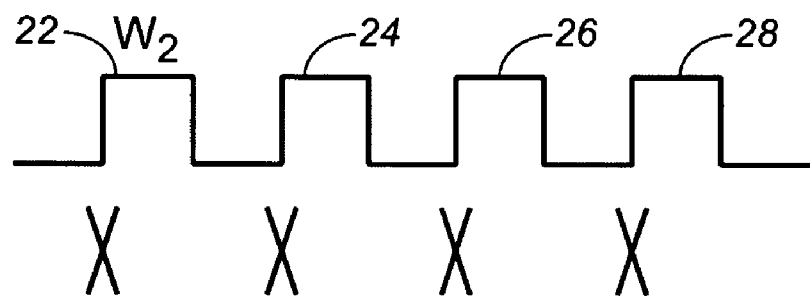
FIG. 1B illustrates first several symbols of smoothed burst signal of FIG. 1A comprising an output synchronous signal.

In an embodiment of the technology, FIG. 1A depicts first several symbols 12, 14, 16, and 18 of an asynchronous input burst signal 10. FIG. 1B depicts an output synchronous signal 20 having first several symbols 22, 24, 26, and 28. Thus, the input asynchronous signal 10 is smoothed by the demodulator's smoothing circuit of the present technology and is transformed into the synchronous output signal 20.

Figure 2:
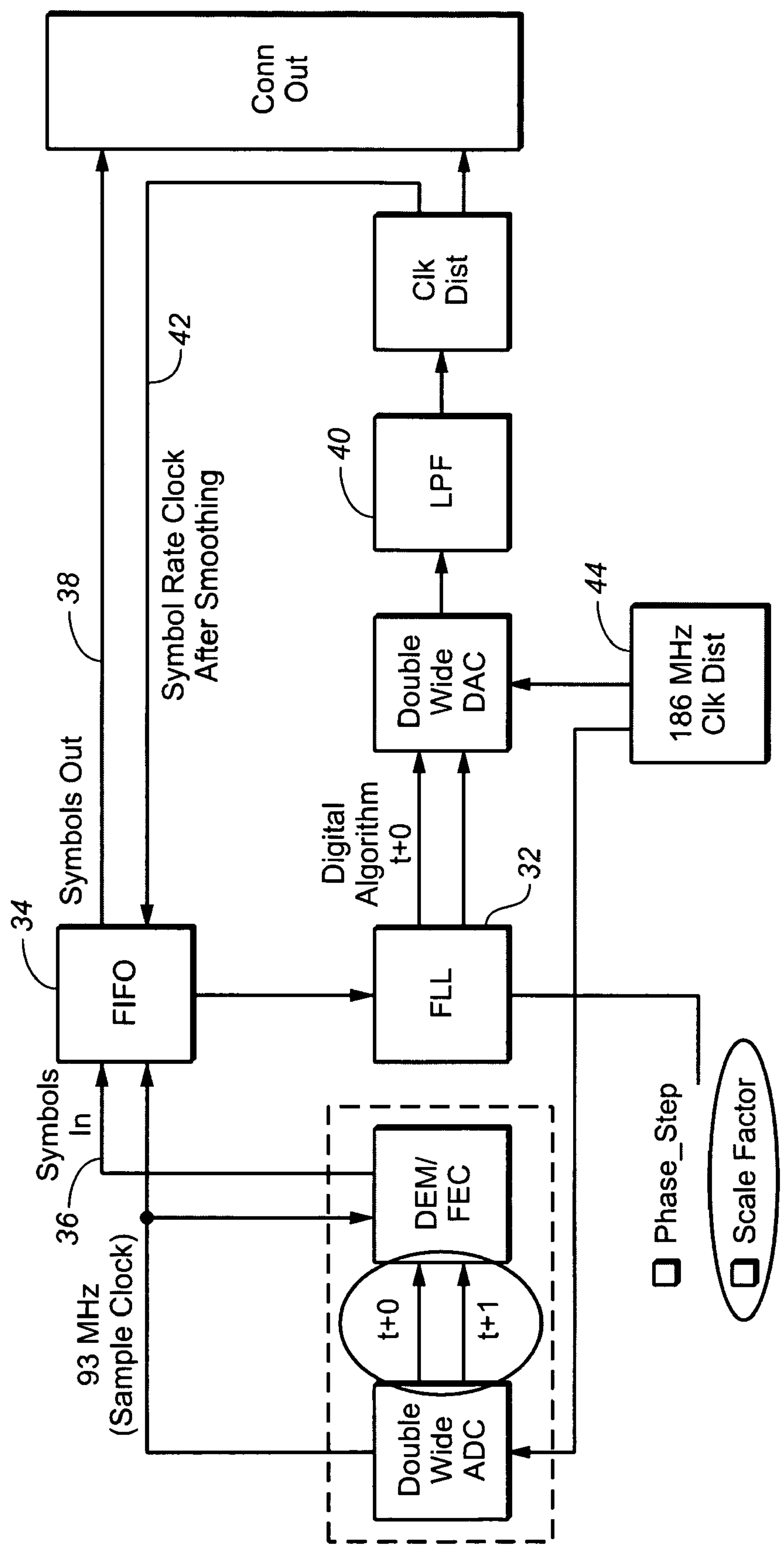
FIG. 2 shows the basic design of the demodulator's smoothing circuit

In an embodiment of the present technology, FIG. 2 shows the basic design 30 of the demodulator's smoothing circuit of the present technology comprising the frequency lock loop (FLL) block 32 that is configured to implement the digital algorithm of the present technology. Block 32 of FIG. 2 comprises frequency lock loop (FLL) further comprising the phase detector error generator (not shown).

In an embodiment of the present technology, referring still to FIG. 2, the FIFO 34 represents a 2-port memory device. Each input symbol 36 is stored in a register (not shown) having an input address (not shown), whereas each output symbol 38 is read out from a register (not shown) having an output address (not shown.)

To obtain an accurate count of symbols within the FIFO across the asynchronous clock domains (input vs. output clock), the output address is subtracted from the input address modulo B, where B is the FIFO depth. In one embodiment of the present technology, B=4096 as shown in FIG. 3B. In obtaining an output address of the register the output symbol is read out from, the output address from the FIFO is gray-coded, synchronized (through serial FIFO's operated by the input clock), and inversely gray-coded (not shown). This sequence of operations causes the output count to be accurate to +1 symbol due to the nature of gray-coding in which only a single bit changes with each address change.

Figure 3A:
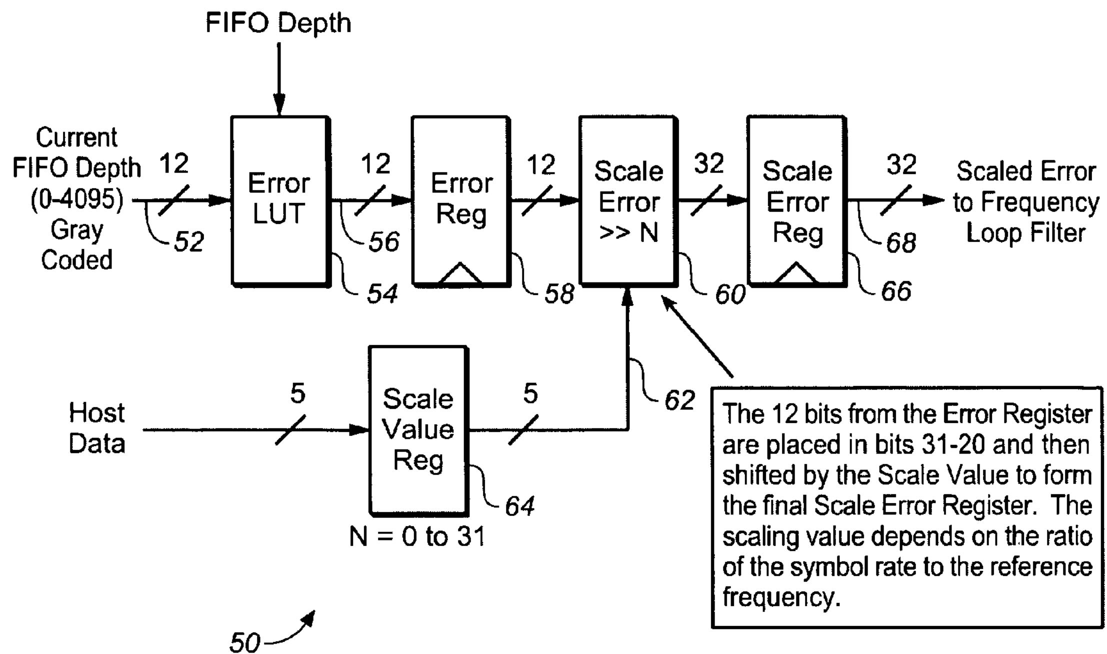
FIG. 3A depicts the error generator in more details.
Figure 3B:
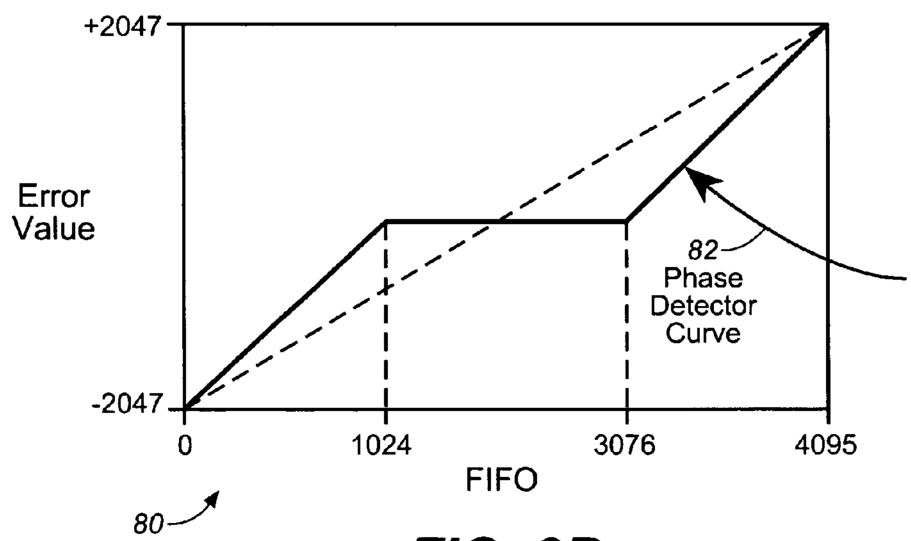
FIG. 3B illustrates the Phase Detector curve installed in the error look-up table (Error-LUT).

In an embodiment of the present technology, the phase detector error generator 50 is depicted in FIG. 3A in more details. The error generator 50 gets the current gray-coded FIFO depth (34 of FIG. 2) (12 bits) and performs a look-up table operation via Error-LUT 54 to get the error value 56 (12 bits) based on the installed Phase Detector curve (82 of FIG. 3B). The Phase Detector curve (82 of FIG. 3B) installed in the Error-LUT 54 is programmable so that the error limit and hysterisis can be configured for various operational modes.

In an embodiment of the present technology, referring still to FIG. 3A, the 12 bits error value 56 is stored in the Error Register 58. The 12 bits from the Error Register 58 are placed in bits 31-20 and then shifted by the scaling value 62 (5 bits) (stored in the Scale value Register 64) to form the final Scale Error Register 66 (32 bits).

In an embodiment of the present technology, referring still to FIG. 3A, the output of from the Error Register 58 is scaled to normalize it to the symbol rate and damping factor being used.

In an embodiment of the present technology, the stored error value (12 bits) is further scaled by a binary power of 2 to compensate for the different baud rates (actually byte rates). If the binary power of 2 is in the range (0 to 10) for the scaling purposes, the actual scaling factor is in the range (1 to 1024). If one can make the range from 0 to 31 a 5-bit value will allow a complete 32-bit shift.

In an embodiment of the present technology, the scaling shifts are implemented by using a barrel shifter, i.e., a conditional shift by 16, followed by a conditional shift by 8, . . . , followed by a conditional shift of 1. The 12-bit error value starts in bit positions 31-20 with zero padding in positions 19-0. The scaling value 62 depends on the ratio of the symbol rate to the reference frequency. The scaled error 68 (32 bits) is further processed by the Loop Filter (LPF) 40 (of FIG. 2).

Figure 4:
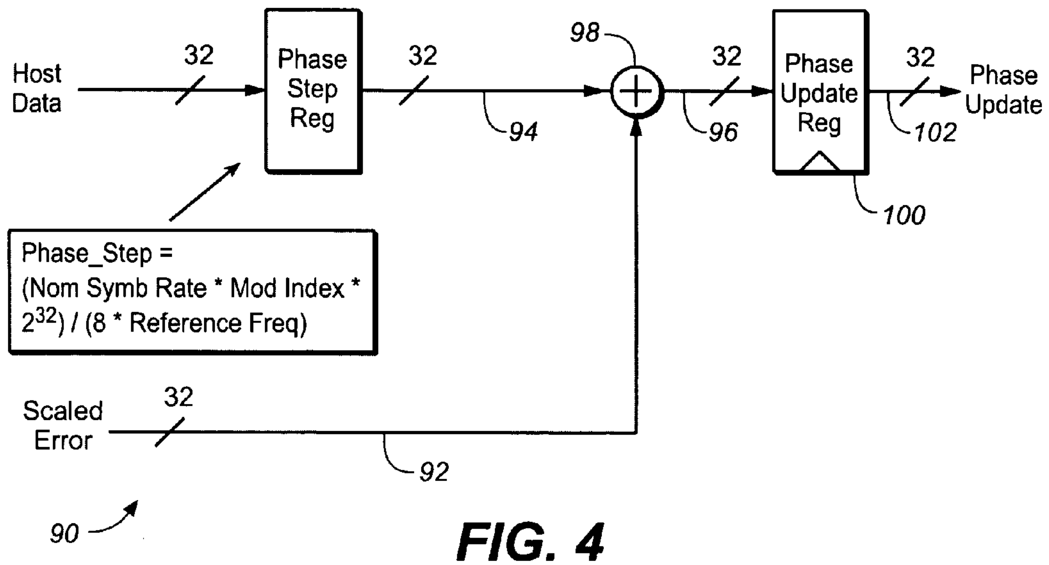
FIG. 4 shows the phase update block.

In an embodiment of the present technology, the phase update block 90 is shown in FIG. 4. The scaled error factor 90 (having 32 bits) is added to the nominal phase step 94 (having 32 bits) (nominal symbol rate output) in the adder block 98 to obtain the phase update 96 (having 32 bits). The phase update 96 is stored in the Phase update Register 100. The phase update 102 is read out from the Phase update Register 100.

Figure 5:
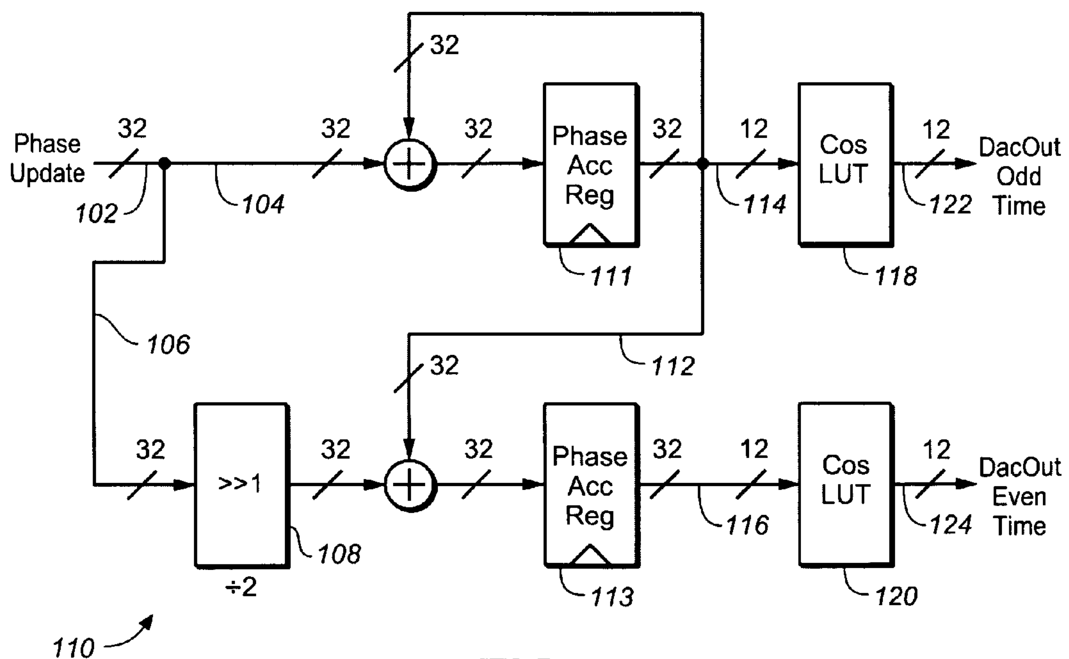
FIG. 5 illustrates the two-stage phase accumulator.

In an embodiment of the present technology, the two-stage phase accumulator 110 is depicted in FIG. 5. The two-stage phase accumulator 110 comprises the phase accumulator register 111 in the first stage and the phase accumulator register 113 in the second stage. The phase update 102 is further multiplied by the factor ½ in the block 108 in the second stage and is added in the adder block 110 to the output 112 from the first stage phase accumulator 111. For each stage of the phase accumulator, the Most Significant Bits (MSBs) (114 for the first stage and 116 for the second stage) are used as inputs to Cosine LUT (118 for the first stage and 120 for the second stage) to obtain the next Direct Digital Synthesis (DDS) clock input values 122 (for odd times) and 124 (for even times) for that phase.

Figure 6:
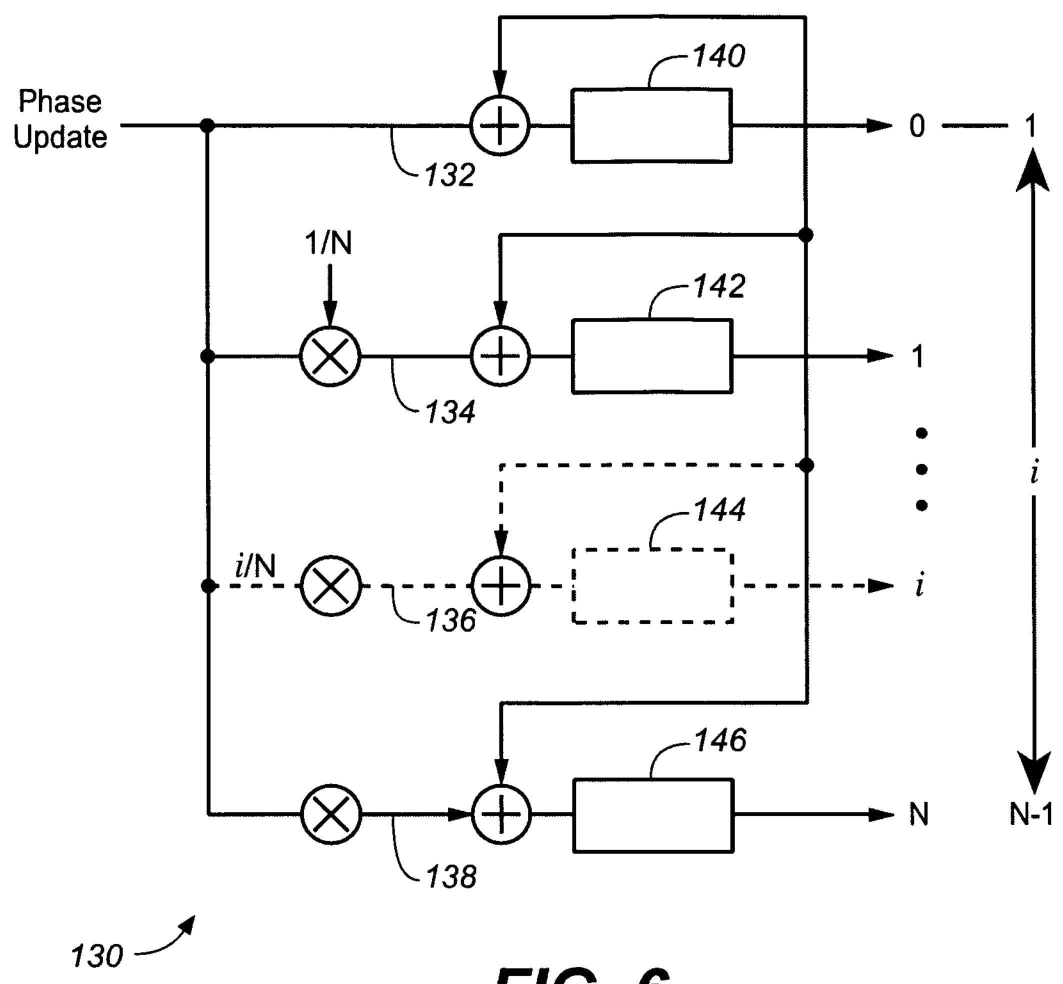
FIG. 6 depicts the N-stage phase accumulator.

In an embodiment of the present technology, the N-stage phase accumulator 130 is depicted in FIG. 6. The N-stage phase accumulator 130 comprises the first phase accumulator register 140 in the first stage, the second phase accumulator register 142 in the second stage, the i-stage phase accumulator 144 in the i-th stage, and the N-th phase accumulator register 146 in the last N-th stage. In each stage, the phase update is further multiplied by the factor i/N (only shifts required for power of 2 numbers of accumulators) and is added to the i-th accumulator for all i-th stage phase accumulators, integer "i" is equal to or less than N. The N-stage phase accumulator 130 outputs N different phase outputs which allows one to update DDS that N phase inputs where N is the ratio of the DDS clock and the clock rate of the smoothing circuit. For each stage, the phase accumulator's MSBs are used as the input to Cosine LUT (not shown) to obtain the next DDS input value for that phase.

Referring still to FIG. 2, the DDS output 42 is used as the symbol rate clock after smoothing. This is the synchronous symbol rate at which the symbols 38 are read out from the FIFO block 34.

Example

To compute the smoothing circuit values the following procedure is followed assuming a 186.667 MHz reference frequency (block 44 of FIG. 2).

A. Phase Step.

The phase step is the value that sets the nominal frequency (natural frequency) out of the smoothing loop assuming no frequency updates. This frequency is computed as follows:

$$\text{Phase Step}=(\text{Nominal Symbol Rate}*\text{Modulation Index}*2^{32})/(\text{Reference Frequency}*8). \quad \text{(Eq. 1)}$$

The phase step given by (Eq.1) can be computed for different types of QAM modulations.

For BPSK modulation, whereas the modulation index is 1, and where the symbol rate is in MHz, (Eq.1) can be re-written as follows:

$$\text{Phase Step}=(\text{Nominal Symbol Rate}/186.667)*0.125*2^{32}. \quad \text{(Eq.2)}$$

For QPSK modulation, whereas the modulation index is 2, and where the symbol rate is in MHz, (Eq.1) can be re-written as follows:

$$\text{Phase Step}=(\text{Nominal Symbol Rate}/186.667)*0.250*2^{32}. \quad \text{(Eq.3)}$$

For 8 PSK modulation, whereas the modulation index is 3, and where the symbol rate is in MHz, (Eq.1) can be re-written as follows:

$$\text{Phase Step}=(\text{Nominal Symbol Rate}/186.667)*0.375*2^{32}. \quad \text{(Eq.4)}$$

For 16 PSK modulation, whereas the modulation index is 4, and where the symbol rate is in MHz, (Eq.1) can be re-written as follows:

$$\text{Phase Step}=(\text{Nominal Symbol Rate}/186.667)*0.500*2^{32}. \quad \text{(Eq.5)}$$

For 32 PSK modulation, whereas the modulation index is 5, and where the symbol rate is in MHz, (Eq.1) can be re-written as follows:

$$\text{Phase Step}=(\text{Nominal Symbol Rate}/186.667)*0.625*2^{32}. \quad \text{(Eq.6)}$$

For 64 PSK modulation, whereas the modulation index is 6, and where the symbol rate is in MHz, (Eq.1) can be re-written as follows:

$$\text{Phase Step}=(\text{Nominal Symbol Rate}/186.667)*0.750*2^{32}. \quad \text{(Eq.7)}$$

For 128 PSK modulation, whereas the modulation index is 7, and where the symbol rate is in MHz, (Eq.1) can be re-written as follows:

$$\text{Phase Step}=(\text{Nominal Symbol Rate}/186.667)*0.875*2^{32}. \quad \text{(Eq.8)}$$

Finally, for 256 PSK modulation, whereas the modulation index is 8, and where the symbol rate is in MHz, (Eq.1) can be re-written as follows:

$$\text{Phase Step}=(\text{Nominal Symbol Rate}/186.667)*1.000*2^{32}. \quad \text{(Eq.9)}$$

If raw symbols are being output the 256QAM formula of (Eq.9) should be used.

B. Limit Check

The limit check is the value that clips updates to the frequency offset register to+Limit Check. The limit check is simply computed as the phase step multiplied by the maximum uncertainty allowed. Assuming the maximum uncertainty is $10^{-3}$, the limit check is computed as follows:

$$\text{Limit Check}=\text{Phase Step}*10^{-3}, \quad \text{(Eq.10)}$$

where, the phase step is given by (Eq.1).

C. Error Scale

The error scale is the value that is used to scale the phase detector curve based on baud rate. The error scale is computed as a ratio between the maximum symbol rate in use and the selected symbol rate. The scaling is performed as a power of 2 scaling. Since the maximum error value is set at +2047 in bit positions 31 through 20, it can scaled down by up to 31 right shifts with sign extension. The error value is related to the limit check so that the error value would not be a significant portion of the maximum frequency offset after scaling. Thus, the error value is damped considerably even at maximum error values. Assuming a damping factor β, the required scaling is computed as follows:

$$\text{Error\_Scale}=(2047*2^{20})/(\text{Limit\_Check}*\beta). \quad \text{(Eq.11)}$$

To obtain the number of right shifts the Log 2 (Error_Scale) is taken and rounded up to the nearest integer.

D. Creating Limit Masks.

Once the limit check value is computed its absolute value is rounded to the nearest power of 2. Two masks values are created: the first positive test mask is configured to test positive limits, and the second negative test mask is configured to test negative limits.

More specifically, the first positive test mask comprises all 1's in the 32 bit register down to the power of 2 position for the limit. The bit positions after the power of 2 limit are all 0's. The first positive test mask is logically added (AND'd) to the next frequency offset value. The result is tested for all 0's.

More specifically, the second negative test mask comprises all 0's in the 32 bit register down to the power of 2 position for the limit. The bit positions after the power of 2 limit are all 1's. The second negative test mask is logically multiplied (OR'd) with the next frequency offset value. The result is tested for all 1's.

If neither test is true then the limit has been exceeded. The MSB of the next frequency offset determines whether the limit will be set negative or positive. If the sign is positive, the next frequency offset value is set to the positive value of the limit check. If the sign is negative, the next frequency offset value is set to the negative value of the limit check.

One aspect of the present technology is directed to a method for digital clock smoothing.

In an embodiment of the present technology, the method of the present technology comprises (not shown): (A) inputting an asynchronous data stream having an asynchronous symbol rate into a two-port memory block; (B) accumulating a plurality of symbols of the asynchronous data stream in the two-port memory block for a predetermined time period long enough to accommodate the worst case burst and symbol offset; (C) computing an average symbol rate for the input asynchronous data stream; (D) generating a clock error signal equal to the difference between the average symbol rate of the input asynchronous data stream and a nominal output synchronous clock; (E) obtaining a smoothed symbol rate clock by using the error clock signal; and (F) generating an output smoothed data stream having the smoothed symbol rate clock.

In an embodiment of the present technology, the method comprises (not shown): (A) inputting an asynchronous data stream having an asynchronous symbol rate into a FIFO two-port memory block; (B) storing each input symbol in the FIFO under control of an input FIFO address control register; (C) obtaining a smoothed symbol rate; and (D) reading out each output symbol from the FIFO under control of an output FIFO address control register at the smoothed symbol rate.

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method for digital clock smoothing comprising:

(A) inputting an asynchronous data stream having an asynchronous symbol rate into a FIFO two-port memory block;

(B) obtaining said FIFO depth B by subtracting modulo B for each stored symbol a symbol output address from a symbol input address;

(C) inputting said FIFO depth B into a programmable Look Up Table (LUT);

(D) obtaining a phase detector error signal;

(E) scaling said phase detector error signal to obtain a scaled error factor, wherein said scaled error factor is normalized by using a set of parameters selected from the group consisting of: {a ratio of an input symbol rate to a reference clock; and a damping factor configured to compensate for latency of a frequency lock loop (FLL)};

(F) adding said scaled error factor to a nominal phase step to obtain a phase update;

(F1) computing said nominal phase step by using a nominal symbol rate, a modulation index, and a reference frequency;

(G) obtaining a smoothed symbol rate; and (H) reading out each output symbol from said FIFO under control of an output FIFO address control register at said smoothed symbol rate.

2. The method of claim 1, wherein said step (F1) further comprises:

(F1, 1) selecting said modulation index for BPSK modulation.

3. The method of claim 1, wherein said step (F1) further comprises:

(F1, 2) selecting said modulation index for QPSK modulation.

4. A method for digital clock smoothing comprising:

(A) inputting an asynchronous data stream having an asynchronous symbol rate into a FIFO two-port memory block;

(B) obtaining said FIFO depth B by subtracting modulo B for each stored symbol a symbol output address from a symbol input address;

(C) inputting said FIFO depth B into a programmable Look Up Table (LUT);

(D) obtaining a phase detector error signal;

(E) scaling said phase detector error signal to obtain a scaled error factor, wherein said scaled error factor is normalized by using a set of parameters selected from the group consisting of: {a ratio of an input symbol rate to a reference clock; and a damping factor configured to compensate for latency of a frequency lock loop (FLL)};

(F) adding said scaled error factor to a nominal phase step to obtain a phase update;

(F2) limiting said nominal phase step;

(G) obtaining a smoothed symbol rate; and (H) reading out each output symbol from said FIFO under control of an output FIFO address control register at said smoothed symbol rate.

5. The method of claim 4, wherein said step (F2) further comprises:

(F2, 1) creating limit masks.

6. The method of claim 4, wherein said step (F2) further comprises:

(F2, 2) creating a positive limit mask.

7. The method of claim 4, wherein said step (F2) further comprises:

(F2, 3) creating a negative limit mask.

* * * * *